UNITED STATES PATENT OFFICE.

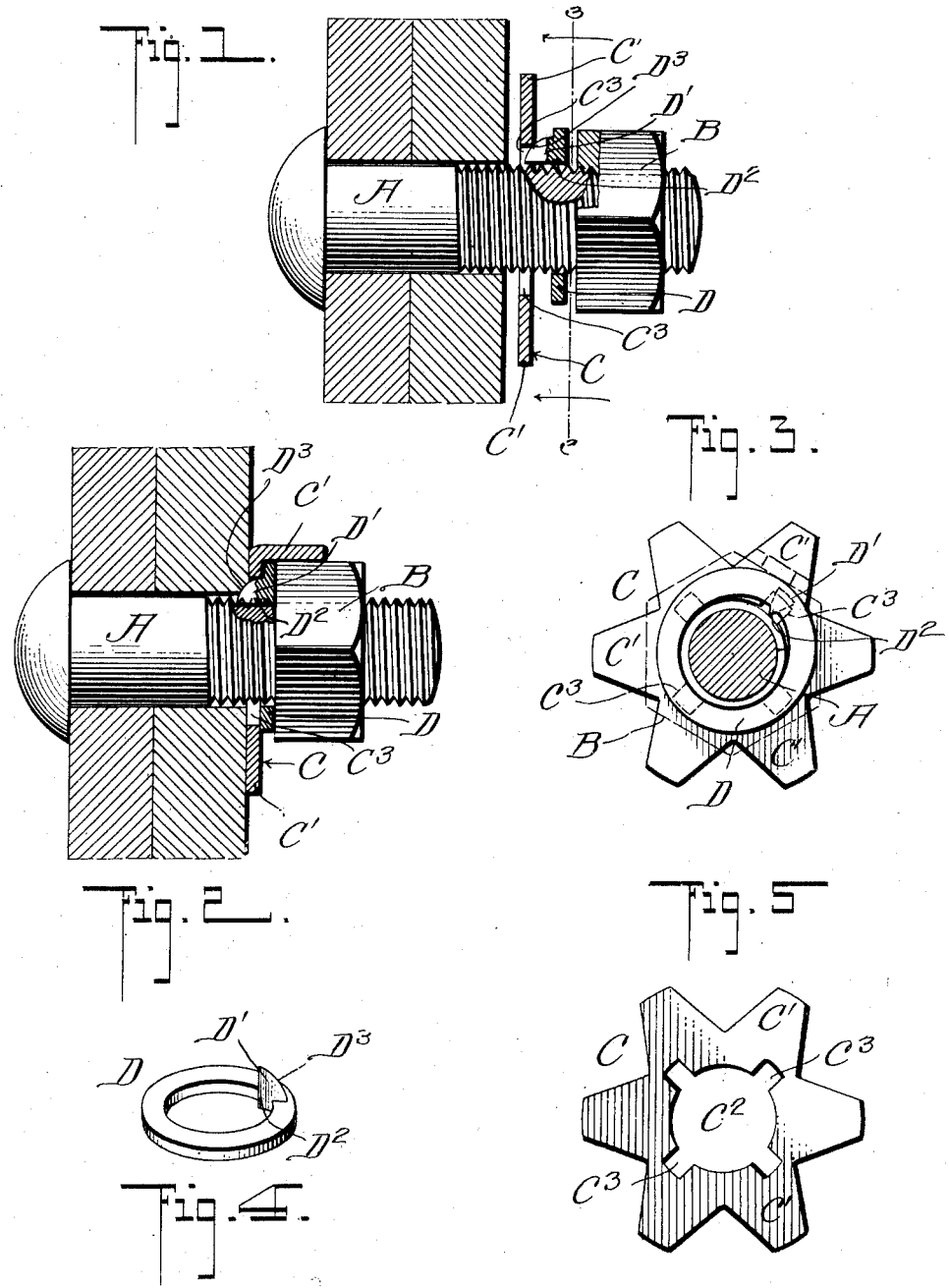

CHARLES R. MERVIN, OF SWEET, IDAHO.

NUT-LOCK.

No. 926,953.   Specification of Letters Patent.   Patented July 6, 1909.

Application filed April 18, 1908. Serial No. 427,829.

*To all whom it may concern:*

Be it known that I, CHARLES R. MERVIN, a citizen of the United States, residing at Sweet, in the county of Boise and State of Idaho, have invented a new and useful Improvement in Nut-Locks, of which the following is a specification.

This invention is an improved construction of nut lock, the object being to provide an exceedingly cheap and highly efficient construction of lock which can be used in connection with the ordinary bolts and nuts now in common use.

With this object in view, the invention consists in the novel feature of construction and combination of parts, all of which will be fully described and hereinafter pointed out in the claims.

In the drawing forming a part of this specification:—Figure 1 is a sectional elevation showing the various parts of my invention in process of being assembled. Fig. 2 is a similar view showing the nut screwed to place and locked. Fig. 3 is a sectional elevation on the line 3—3 of Fig. 1. Fig. 4 is a detail perspective view of the locking ring, and Fig. 5 is a face view of the locking washer.

In carrying out my invention I employ the ordinary bolt A and the ordinary construction of nut B. The locking washer C is preferably made in the shape of a star and is therefore provided with a plurality of wings or lobes C' which are adapted to be turned up alongside the nut for the purpose of locking said nut against rotation, as most clearly shown in Fig. 2.

The central opening $C^2$ of the washer has the notches or recesses $C^3$ leading into the same, said recesses being preferably four in number and arranged at equi-distant points and on radial lines, as most clearly shown in Fig. 5.

The washer C is placed upon the bolt and then upon this washer I arrange a ring D which fits loosely over the bolt and is provided with a depending lug D' which is adapted to fit into one of the recesses $C^3$ and a tooth $D^2$ is formed upon the interior of the ring, adjacent the finger D' and projects inwardly a sufficient distance to engage the thread of the bolt as the nut is screwed down, and it will be noted that the outer face of the finger D' is curved or inclined as shown at $D^3$ so that as the ring is forced down, the said finger riding upon the outer edge of the recess $C^3$ will cause the tooth $D^2$ to be forced into the thread of the bolt as most clearly shown in Fig. 2, and in this manner the ring is securely locked to the bolt and by means of the finger and the notched washer, said washer is firmly held against rotation, and after being thus securely locked against rotation, one wing or lobe thereof can be turned up alongside the nut, and thereby securely hold said nut in a locked position.

It will thus be seen that I provide an exceedingly simple and highly efficient form of lock.

Having thus fully described my invention, what I claim as new and desire to secure by Letters Patent is:—

1. The combination with a bolt and nut, of a washer having a plurality of flexible wings arranged on said bolt, the side walls of the opening of the washer being provided with oppositely disposed recesses, a ring arranged on said bolt between the washer and nut, said ring being provided with a depending lug adapted to fit in one of the recesses of the washer, said ring being provided with a tooth upon the interior of the same adjacent the lug, the outer face of the lug being curved or inclined adapted to be forced down by the recess, which will force the tooth into engagement with the threads of the bolt.

2. The combination with a bolt and nut, of a washer having a plurality of wings, the side walls of the central opening of the washer being recessed to form notches, a ring arranged between the nut and washer, said ring having a lug adapted to fit into a notch of the washer the outer face of said lug being inclined and a tooth carried by the ring adjacent the lug and projecting inwardly said tooth being adapted to engage the thread of the bolt when said ring is forced into contact with the washer, one wing of said washer being adapted to be turned up alongside a face of the nut, for the purpose set forth.

CHARLES R. MERVIN.

Witnesses:
GEO. ROSS,
SAMUEL T. LILLY.